United States Patent
Ren et al.

(10) Patent No.: US 11,554,414 B2
(45) Date of Patent: Jan. 17, 2023

(54) LASER-SOLID-FORMING MANUFACTURING DEVICE AND METHOD

(71) Applicant: Shanghai University, Shanghai (CN)

(72) Inventors: Zhongming Ren, Shanghai (CN); Jiang Wang, Shanghai (CN); Jianwen Nie, Shanghai (CN); Chaoyue Chen, Shanghai (CN); Wei Liu, Shanghai (CN); Ruixin Zhao, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 287 days.

(21) Appl. No.: 16/919,343

(22) Filed: Jul. 2, 2020

(65) Prior Publication Data

US 2021/0001400 A1 Jan. 7, 2021

(30) Foreign Application Priority Data

Jul. 3, 2019 (CN) .......................... 201910593458.5

(51) Int. Cl.
*B22F 3/10* (2006.01)
*B22F 10/00* (2021.01)
*B33Y 30/00* (2015.01)
*B33Y 50/02* (2015.01)

(52) U.S. Cl.
CPC ............ *B22F 3/1028* (2013.01); *B22F 10/00* (2021.01); *B22F 2202/05* (2013.01);
(Continued)

(58) Field of Classification Search
None
See application file for complete search history.

(56) References Cited

U.S. PATENT DOCUMENTS 3,544,757 A * 12/1970 Taudvin .................... C22B 4/00
219/121.62
6,505,089 B1 * 1/2003 Yang .................. G05B 19/4099
700/98
(Continued)

FOREIGN PATENT DOCUMENTS

CN 104827033 A * 8/2015 ............. B33Y 10/00
CN 105689710 A * 6/2016 ............. B33Y 30/00
(Continued)

OTHER PUBLICATIONS

Machine Translation of KR101518402B1 (Year: 2014).*
(Continued)

*Primary Examiner* — Keith Walker
*Assistant Examiner* — Ryan L Heckman
(74) *Attorney, Agent, or Firm* — Hoffmann & Baron, LLP

(57) ABSTRACT

A laser-solid-forming manufacturing device includes a laser emitter, a magnetic field generator, and a forming platform. The laser emitter emits a laser beam which acts on a feedstock to form a molten pool. The magnetic field generator includes a spiral copper coil, a first electrode and a second electrode. The spiral copper coil is formed by spirally winding a copper tube. The first and second electrodes are arranged at respective ends of the copper tube and are used for loading a voltage to generate a magnetic field in the spiral copper coil. At any time, the spiral copper coil sleeves an action point of the laser beam and the feedstock. A corresponding laser-solid-forming manufacturing method is also presented.

7 Claims, 3 Drawing Sheets

(52) U.S. Cl.
CPC ........... *B22F 2202/11* (2013.01); *B33Y 30/00* (2014.12); *B33Y 50/02* (2014.12)

(56) References Cited

U.S. PATENT DOCUMENTS

| | | | | |
|---|---|---|---|---|
| 10,974,321 | B2* | 4/2021 | Karlen | .................... B33Y 30/00 |
| 2015/0239148 | A1* | 8/2015 | Israel | .................... B29C 64/106 |
| | | | | 425/375 |
| 2016/0067740 | A1* | 3/2016 | Voris | ....................... B33Y 10/00 |
| | | | | 425/150 |
| 2019/0040503 | A1* | 2/2019 | Martin | ................. B23K 26/144 |

FOREIGN PATENT DOCUMENTS

| | | | | | |
|---|---|---|---|---|---|
| CN | 105772722 | A | * | 7/2016 | ............ B22F 3/1055 |
| CN | 105798299 | A | * | 7/2016 | ............. B33Y 30/00 |
| CN | 104722761 | B | * | 10/2016 | ............ B22F 3/1035 |
| CN | 207650775 | U | * | 7/2018 | .............. B33Y 10/00 |
| CN | 108788152 | A | * | 11/2018 | ............... B22F 3/003 |
| KR | 101518402 | B1 | * | 10/2014 | ............... B29C 67/00 |
| KR | 101677452 | B1 | * | 11/2016 | ............. B33Y 50/02 |

OTHER PUBLICATIONS

Machine Translation of CN-207650775-U (Year: 2018).*
Machine Translation of CN-108788152-A (Year: 2018).*
Machine Translation of CN-105689710-A (Year: 2016).*
Machine Translation of KR-101677452B1 (Year: 2016).*
Machine Translation of CN-104722761-B (Year: 2016).*
Machine Translation of CN-105798299-A (Year: 2016).*
Machine Translation of CN-105772722-A (Year: 2016).*
Machine Translation of CN-104827033-A (Year: 2015).*

* cited by examiner though the laser solid forming technology can produce real components having any structure theoretically, the surface finish control of the component is always difficult.

LASER-SOLID-FORMING MANUFACTURING DEVICE AND METHOD

CROSS-REFERENCE TO RELATED APPLICATIONS

This application claims priority to Chinese Patent Application No. 201910593458.5, filed on Jul. 3, 2019, the disclosure of which is incorporated by reference herein in its entirety for all purposes.

TECHNICAL FIELD

The present invention relates to the field of laser solid forming technologies, and in particular, to a laser-solid-forming manufacturing device and method.

BACKGROUND

Laser solid forming technology is to melt metal powders or wires by utilizing the high-energy laser beam as the heat source and then quickly cool and solidify the molten metal to be formed on the substrate. The computer software firstly layers and slices the three-dimensional model of a component, namely converting the three-dimensional shape information of the component into a series of two-dimensional outline information. Then, the information of each layer is utilized as the path to be scanned by the high-energy laser beam. Finally, a real metal component having the same geometrical size as the designed component is formed by stacking the deposited materials layer by layer.

Recently, this technology is widely applied to the manufacture of metal components in the fields of aerospace, medical equipment, and the like. Especially, it is applied to the manufacturing of high-performance and large-size key components made from titanium alloy, nickel-based superalloy in the aerospace field. The high-energy laser beam acts on the metal powders or wires to form a molten pool. The size of the formed molten pool is approximately equal to the spot size of the laser. Therefore, the forming precision of the metal component can basically meet the design size requirement.

However, in the relatively independent layer-by-layer scanning, stacking and forming process, although the laser solid forming technology can produce real components having any structure theoretically, the surface finish control of the component is always difficult.

In the laser solid forming process, the molten pool has the flow, which is the molten metal flows from center to periphery due to the high-temperature gradient. Thus, the gas-liquid free interface is unstable. Furthermore, under the influence of heat transfer, there are a large amount of incompletely molten metal powders or wires at the boundary of the molten pool. These semi- or un-melted particles attached to the periphery of the molten pool severely influence the surface finish of the metal components.

SUMMARY

The objective of the present invention is to propose a laser-solid-forming manufacturing device and method, so as to improve the surface finish of a laser-solid-forming metal component.

To achieve the above objective, the present invention provides the following solution:

A laser-solid-forming manufacturing device comprises a laser emitter, a magnetic field generator, and a forming platform.

The forming platform is horizontally arranged and is used for placing feedstock.

The laser emitter is located above the forming platform and is used for emitting the laser beam, which acts on the feedstock to form a molten pool.

The magnetic field generator comprises a spiral copper coil, the first electrode, and the second electrode.

The spiral copper coil is formed by spirally winding a copper tube.

The first electrode and the second electrode are respectively arranged at two ends of the copper tube and are used for loading (supplying) the voltage to generate a magnetic field in the spiral copper coil.

At any time, the spiral copper coil sleeves, encircles, surrounds, passes through, and/or slices the action point (interaction) of the laser and the feedstock.

Optionally, the device further comprises a regulator.

The regulator is connected with the spiral copper coil and is used for regulating the horizontal position of the spiral copper coil and the intersection angle between the spiral copper coil and the forming platform.

Optionally, the regulator comprises a rotating disc.

The two ends of the copper tube extend in the same direction and are respectively connected with the rotating disc.

The rotating disc rotates to drive the spiral copper coil to rotate so as to regulate the intersection angle between the spiral copper coil and the forming platform.

Optionally, the regulator further comprises an x-direction mobile shaft and an x-direction rail.

The x-direction rail is horizontally arranged.

The x-direction mobile shaft is respectively vertical to the rotating disc and the x-direction rail.

One end of the x-direction mobile shaft is inserted in the rotating disc and is rotationally connected with the rotating disc.

The other end of the x-direction mobile shaft is slidingly (i.e., slidably) connected with the x-direction rail in the extension direction of the x-direction rail.

Optionally, the regulator further comprises two y-direction rails.

The two y-direction rails are arranged in parallel with each other.

The two y-direction rails are vertical to the x-direction rail.

The x-direction rail is mounted on the two y-direction rails and is respectively slidingly connected with the two y-direction rails in the extension directions of the y-direction rail.

Optionally, the regulator further comprises a z-direction rail and a mobile platform.

The mobile platform is horizontally arranged.

The two y-direction rails are fixed to the mobile platform.

The z-direction rail is vertical to the mobile platform. A hole is formed in the mobile platform.

The z-direction rail passes through the hole to be in sliding contact with the mobile platform.

The mobile platform slides up and down along the z-direction rail.

Optionally, the copper tube has a hollow structure. One end of the copper tube is provided with a cooling water inlet valve, and the other end is provided with a cooling water outlet valve. Water-cooled heat dissipation is achieved by feeding the circular cooling water into the hollow copper tube.

Optionally, the laser emitter is any of a $CO_2$ gas laser, an Nd-YAG laser, and a fiber laser.

A laser-solid-forming manufacturing method comprises the following steps:

uniformly feeding the feedstock to the forming platform;

loading the preset size of a voltage to the spiral copper coil so as to generate the magnetic field;

regulating the horizontal position of the spiral copper coil and the intersection angle between the spiral copper coil and the forming platform such that the feedstock is located in the magnetic field;

controlling the laser emitter to emit the laser beam which acts on the feedstock according to the preset path such that the feedstock at the relative position is molten to form the molten pool;

accumulating multiple molten pools to obtain a formed component.

Optionally, the step of uniformly feeding the feedstock to the forming platform specifically comprises:

uniformly blowing the feedstock to the forming platform under the pneumatic action of inert gas and the gravity action of the feedstock.

According to specific embodiments provided by the present invention, the present invention discloses the following technical effects:

The spiral copper coil is horizontally arranged. The voltage is loaded to the spiral copper coil. Therefore, a magnetic field vertical to the horizontal plane is generated. The laser emitter emits the laser beam, which acts on the feedstock to generate the molten pool. The molten metal in the molten pool flows from center to periphery, and its flowing direction is vertical to the direction of the magnetic induction lines. The melt flow within the molten pool cuts the magnetic field to generate the induced current. The interaction between the melt flow and the induced current under the magnetic field generates the Lorentz force opposite to its flowing direction. Therefore, the melt flow within the molten pool is restrained. The metal within the molten pool has the effect of shrinking to the center. The un-melted feedstock powder attached to and the periphery of the molten pool is reduced. The surface finish of the laser-solid-forming component is improved.

BRIEF DESCRIPTION OF THE DRAWINGS

To describe the technical solutions in the embodiments of the present invention or the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF REFERENCE SIGNS

1—laser emitter; 2—spiral copper coil; 3—molten pool; 4—component; 5—forming platform; 6—first electrode; 7—rotating disc; 8—cooling water inlet valve; 9—x-direction mobile shaft; 10—z-direction rail; 11—cooling water outlet valve; 12—mobile platform; 13—second electrode; 14—x-direction rail; and 15—y-direction rail.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to propose a laser-solid-forming manufacturing device and method so as to improve the surface finish of a laser-solid-forming metal component.

To make the foregoing objective, features, and advantages of the present invention more apparent and more comprehensible, the present invention is further described in detail below, with reference to the accompanying drawings and specific embodiments.

Figure 1:
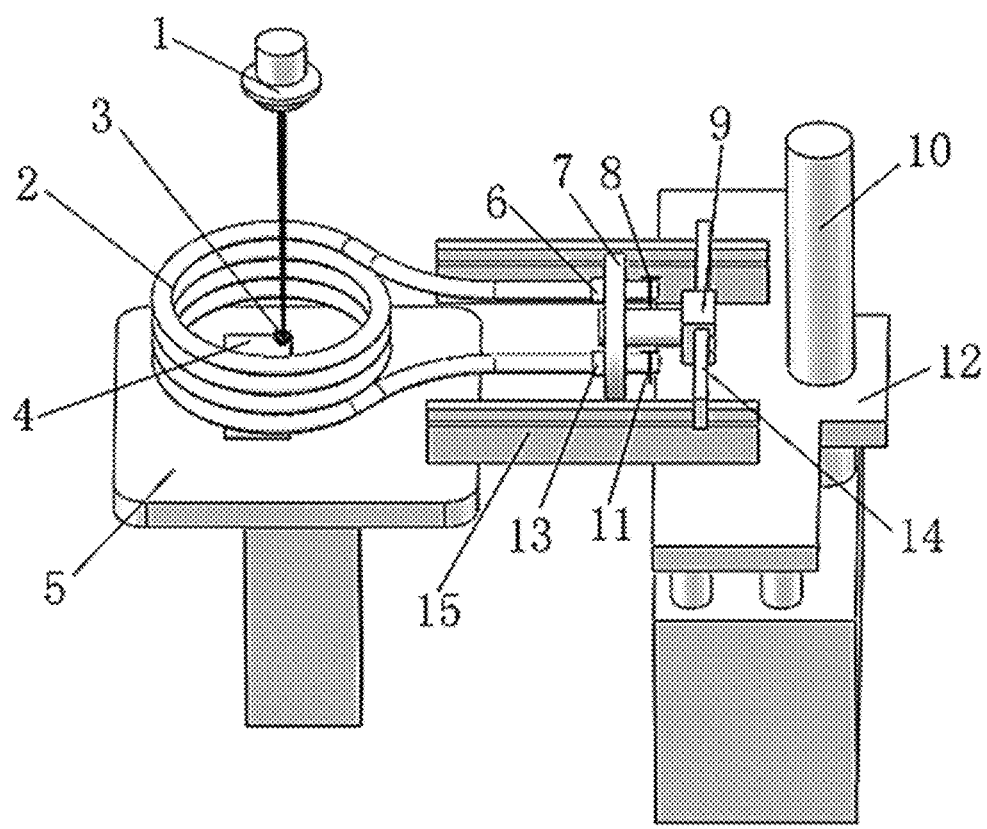
FIG. 1 is a schematic structural diagram of a laser-solid-forming manufacturing device provided in embodiments of the present invention.
Figure 2:
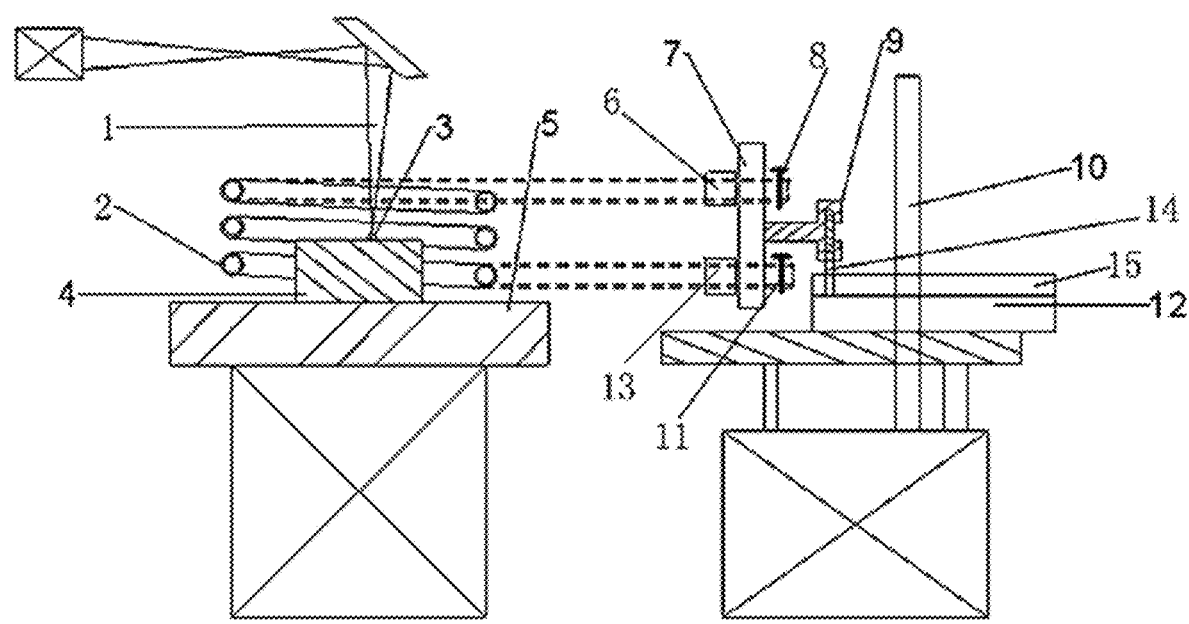
FIG. 2 is a front view of a laser-solid-forming manufacturing device provided in embodiments of the present invention.

FIG. 1 is a schematic structural diagram of a laser-solid-forming manufacturing device provided in embodiments of the present invention. FIG. 2 is a front view of a laser-solid-forming manufacturing device provided in embodiments of the present invention. As shown in FIG. 1 and FIG. 2, a laser-solid-forming manufacturing device comprises a laser emitter 1, a magnetic generator and, a forming platform 5.

The forming platform 5 is horizontally arranged and is used for placing feedstock.

The laser emitter 1 is located above the forming platform 5 and is used for emitting the laser beam, which acts on the feedstock to form a molten pool 3. The laser emitter 1 has an emission power in the range of 0.1-6 KW and a frequency in the range of 1-109 Hz. The emitted laser beam has a spot diameter of 0.2 mm and acts on the feedstock.

Figure 3:
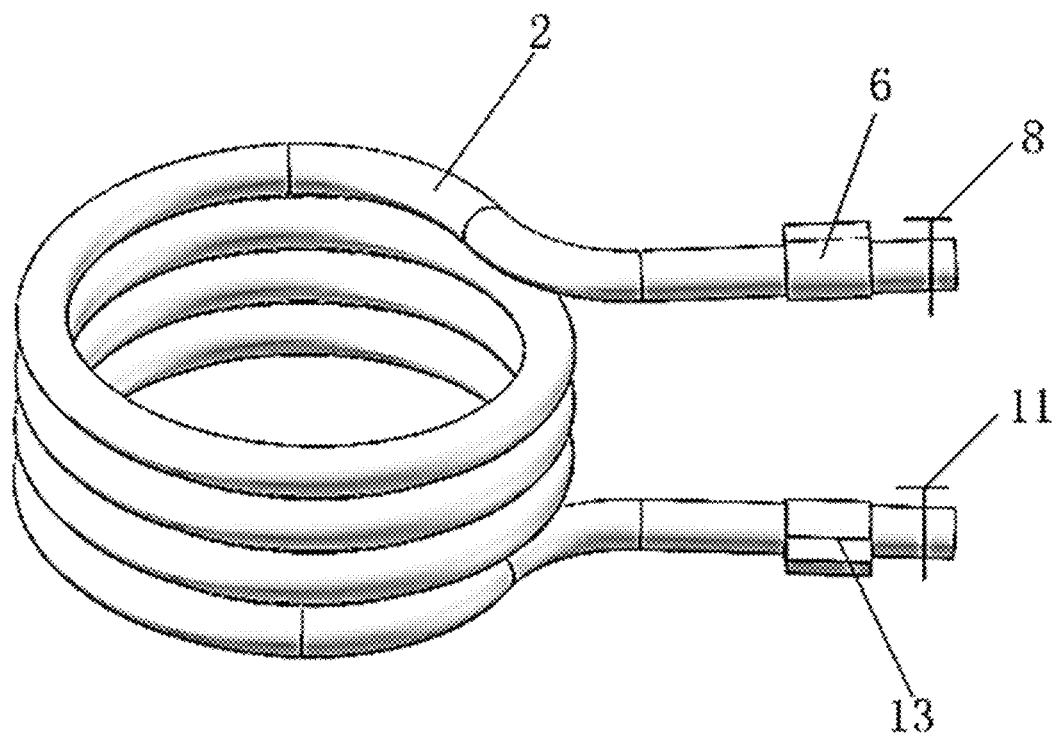
FIG. 3 is a schematic structural diagram of a spiral copper coil provided in embodiments of the present invention.
Figure 4:
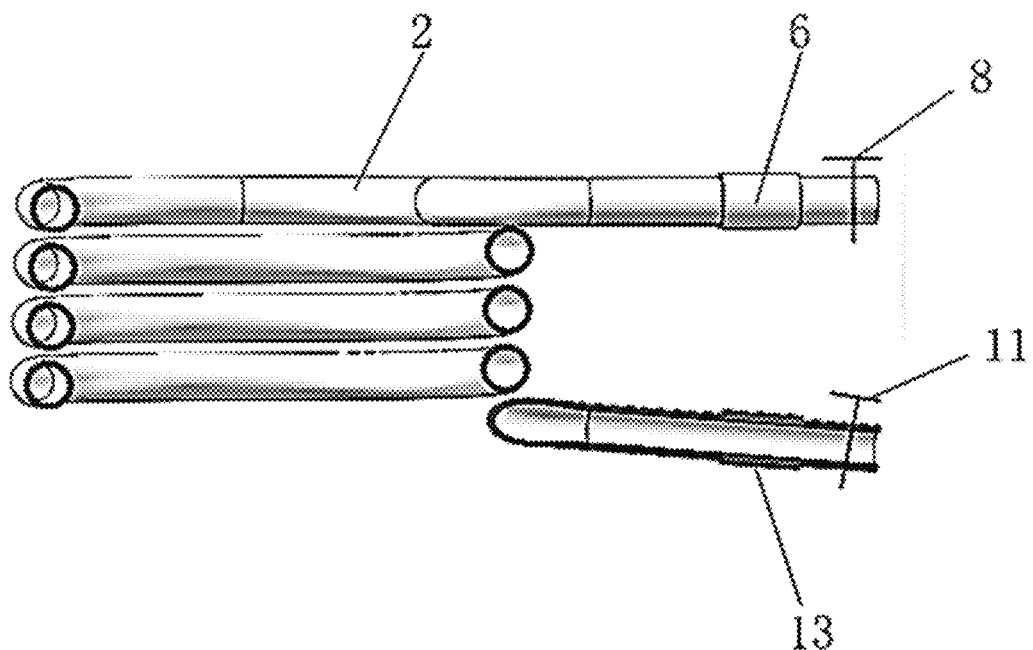
FIG. 4 is a sectional view of a spiral copper coil provided in embodiments of the present invention.

FIG. 3 is a schematic structural diagram of a spiral copper coil provided in embodiments of the present invention. FIG. 4 is a sectional view of a spiral copper coil provided in embodiments of the present invention. As shown in FIG. 3 and FIG. 4, the magnetic field generator comprises a spiral copper coil 2, a first electrode 6, and a second electrode 13.

The spiral copper coil 2 is formed by spirally winding a hollow copper tube.

The first electrode 6 and the second electrode 13 are respectively arranged at two ends of the copper tube and are used for loading (supplying) a voltage to generate a magnetic field in the spiral copper coil 2. In the embodiment, a voltage in the range of 0-380 V is loaded to the hollow copper tube of the spiral copper coil 2.

At any time, the spiral copper coil 2 sleeves, encircles, surrounds, passes through, and/or slices the action point of the laser and the feedstock (the point at which the laser beam interacts with the feedstock).

The device further optionally comprises a regulator.

The regulator is connected with the spiral copper coil 2 and is used for regulating the horizontal position of the spiral copper coil 2 and the intersection angle between the spiral copper coil 2 and the forming platform 5.

The regulator comprises a rotating disc 7.

The two ends of the copper tube extend in the same direction and are respectively connected with the rotating disc 7.

The rotating disc 7 rotates to drive the spiral copper coil 2 to rotate so as to regulate the intersection angle between the spiral copper coil 2 and the forming platform 5.

The regulator further comprises an x-direction mobile shaft 9 and an x-direction rail 14.

The x-direction rail 14 is horizontally arranged.

The x-direction mobile shaft 9 is respectively vertical to the rotating disc 7 and the x-direction rail 14.

One end of the x-direction mobile shaft 9 is inserted in the rotating disc 7 and is rotationally connected with the rotating disc 7.

The other end of the x-direction mobile shaft 9 is slidingly connected with the x-direction rail 14 in the extension direction of the x-direction rail 14.

The regulator further comprises two y-direction rails 15.

The two y-direction rails 15 are arranged in parallel with each other.

The two y-direction rails 15 are vertical to the x-direction rail 14.

The x-direction rail 14 is mounted on the two y-direction rails 15 and is respectively slidingly connected with the two y-direction rails 15 in the extension directions of the y-direction rail 15.

The regulator further comprises a z-direction rail 10 and a mobile platform 12.

The mobile platform 12 is horizontally arranged.

The two y-direction rails 15 are fixed to the mobile platform 12.

The z-direction rail 10 is vertical (perpendicular) to the mobile platform 12. A hole is formed in the mobile platform 12.

The z-direction rail 10 passes through the hole to be in sliding contact with the mobile platform 12.

The mobile platform 12 slides up and down along the z-direction rail 10.

In the laser solid forming process, according to the position change of the metal molten pool 3, the regulator regulates the spiral copper coil 2 to respectively move in the x-direction, y-direction, and z-direction; the rotating disc 7 is used for regulating the intersection angle between the spiral copper coil 2 and the forming platform 5; thus, the metal molten pool 3 is always located at the position having the same magnetic field strength, resulting in the optimal effect of controlling the metal molten pool 3 by the magnetic field. In the embodiment, the horizontal position of the spiral copper coil 2 is respectively regulated in the range of 0-500 mm in the x-direction, the y-direction, and the z-direction. Simultaneously, the rotating disc 7 controls the spiral copper coil 2 to regulate its intersection angle with the forming platform 5 in the magnetic field direction in the range of 0-45 degrees. Furthermore, the magnetic field strength of an external electromagnetic field can be regulated in the range of 0-0.5 T according to different physical parameters of the metal feedstock.

The copper tube has a hollow structure. One end of the copper tube is provided with a cooling water inlet valve 8, and the other end is provided with a cooling water outlet valve 11. Water-cooled heat dissipation is achieved by feeding the circular cooling water into the hollow copper tube. The circular cooling water is fed into the copper tube of the spiral copper coil 2 to reduce the heat generated in the electrified spiral copper coil 2, thereby preventing the spiral copper coil 2 from damage caused by overheating. In the embodiment, the circular cooling water with the flowing speed in the range of 0-1.5 m/s is fed into the copper tube of the spiral copper coil 2 to achieve the water-cooled heat dissipation.

The laser emitter 1 is any of a $CO_2$ gas laser, an Nd-YAG laser, and a fiber laser.

The feedstock is metal powder with the grain size in the range of 1-200 microns and metal wires with the diameter in the range of 0.1-4.0 mm. The feedstock is one or several metal materials selected from the group consisting of non-magnetic stainless-steel materials, aluminum, aluminum alloy, titanium, titanium alloy, nickel, nickel alloy, and cobalt-chromium alloy.

The manufacturing device of the present invention generates the magnetic field by loading (supplying) a voltage to the spiral copper coil 2. The magnetic induction line is parallel with the direction of the laser beam. The molten metal in the metal molten pool 3 flows from center to periphery, and its flowing direction is vertical to the direction of the magnetic induction lines. The melt flow within the molten pool cuts the magnetic field to generate an induced current. The interaction between the melt flow and the induced current under the magnetic field generates a Lorentz force opposite to its flowing direction. Therefore, the melt flow within the molten pool 3 is restrained. The metal within the molten pool 3 has the effect of shrinking to the center. The un-melted feedstock powder attached to and the periphery of the molten pool 3 is reduced. By regulating the voltage loaded to the spiral copper coil 2, the stress of the flowing molten metal in the molten pool 3 in the magnetic field is changed. The attachment between the incompletely molten metal grains and the periphery of each molten pool 3 is reduced. The direct contact portion between one molten pool 3 and the other molten pool 3 is increased. Then, the three-dimensional combination strength of the molten pools 3 of each layer is enhanced. So, the surface finish of the laser-solid-forming component 4 is improved.

The embodiment further provides a laser-solid-forming manufacturing method. The method comprises the following steps:

uniformly feeding the feedstock to a forming platform 5;

loading a preset size of voltage to a spiral copper coil 2 so as to generate a magnetic field;

regulating the horizontal position of the spiral copper coil 2 and the intersection angle between the spiral copper coil 2 and the forming platform 5 such that the feedstock is located in the magnetic field;

controlling the laser emitter 1 to emit a laser beam which acts on the feedstock according to the preset path such that the feedstock at the relative position is molten to form the molten pool 3;

accumulating multiple molten pools 3 to obtain the formed component 4.

The step of uniformly feeding the feedstock to the forming platform 5 specifically comprises:

uniformly blowing the feedstock to the forming platform 5 under the pneumatic action of inert gas and the gravity action of the feedstock.

In the embodiment, the feedstock comprises metal powders. Because the density of the argon is larger than that of the air, the argon may form the argon atmosphere around the metal powders when feeding the metal powders to the forming platform 5. This argon atmosphere can protect the metal molten pool 3 from being oxidized in the forming process.

Specifically, nickel-based superalloy powders are selected as the feedstock. In the laser solid forming process, the inert gas argon is utilized as the protective gas to uniformly feed the nickel-based superalloy powders with the grain size of 0.1 mm to the forming platform 5 at the speed of 100 g/s under the pneumatic action of the argon and the gravity action of the alloy powders. The $CO_2$ laser emitter emits the high-energy laser beam with a power of 700 W. The laser beam acts on the nickel-based superalloy powders. The nickel-based superalloy powders are molten to form one metal molten pool 3 on the forming platform 5. Under the action of heat transfer, the size of the formed molten pool 3 may be slightly larger than the spot diameter (0.2 mm) of the laser beam. The voltage in the range of 0-380 V is loaded to the spiral copper coil 2, wherein the number of turns of the spiral copper coil is in the range of 1-100. Thus, the magnetic field in the range of 0-0.5 T may generate around the spiral copper coil 2. Additionally, the circular cooling water with the flowing speed in the range of 0-1.5 m/s is fed into the copper tube of the spiral copper coil 2 by utilizing an external conveying device to prevent the spiral copper coil from being damaged caused by overheating. The rotating disc 7 rotates to regulate the intersection angle between the spiral copper coil 2 and the forming platform 5 in the range of 0-45 degrees so as to change the direction of the magnetic field. Additionally, the x-direction mobile shaft 9 moves on the x-direction rail at speed in the range of 0-100 mm/s to conduct x-direction regulation. The x-direction rail moves on the y-direction rails 15 at the speed in the range of 0-100 mm/s to conduct y-direction regulation. The mobile platform 12 moves on the x-direction rail 10 at the speed in the range of 0-100 mm/s to conduct z-direction regulation. Therefore, position regulation of the spiral copper coil 2 on the horizontal plane in the x, y, z directions is achieved. The magnetic field changes with the position change of the molten pool 3. The positions of the metal molten pools 3 always have the same magnetic field strength, resulting in the optimal effect of controlling the metal molten pool 3 by the magnetic field.

The spiral copper coil 2 loaded with the voltage may generate the magnetic field in the range of 0-0.5 T. The magnetic field may mutually act on the flowing molten metal in the molten pool 3 such that the metal molten pool 3 has the effect of shrinking to the center. By regulating the voltage loaded to the spiral copper coil 2, the stress of the flowing molten metal in the molten pool 3 in the magnetic field is changed. The effect of directly controlling the molten pool 3 is achieved. The attachment between the metal grains and the periphery of the metal molten pool 3 is reduced. So, the surface finish of the laser-solid-forming component 4 is improved.

The laser-solid-forming manufacturing device and method of the present invention generates the following technical effects:

1. In the present invention, the electric field and the magnetic field are combined to solve the problem that the molten pool 3 cannot be controlled in the quick solidification process of the laser-solid-forming metal component. The direct control on the laser-solid-forming metal molten pool 3 is achieved. The magnetic field and the molten metal of the molten pool 3 mutually act to generate the Lorentz force having the direction opposite to the flowing direction of the molten metal. Therefore, the molten pool 3 changes the flowing and generates center shrinkage. The surface finish of the laser-solid-forming metal component is largely improved.

2. In the present invention, the magnetic field is generated by the spiral copper coil 2 loaded with the voltage. The device is relatively independent. The laser-solid-forming device does not need to be largely changed. Furthermore, the device of the present invention has remarkable characteristics such as great adjustability of magnetic field strength, position, and direction, etc.

3. In the present invention, the control on the laser metal molten pool 3 is non-contact. Compared with the existing method, the present invention hardly brings any impurity pollution to the laser molten pool 3, does not have special requirements on the working environment, can be applied to the laser solid forming process of various metal materials theoretically and greatly reduces the time and the costs of subsequent surface treatment.

Several examples are used for illustration of the principles and implementation methods of the present invention. The description of the embodiments is used to help illustrate the method and its core principles of the present invention. In addition, a person of ordinary skill in the art can make various modifications in terms of specific embodiments and scope of application in accordance with the teachings of the present invention. In conclusion, the content of this specification shall not be construed as a limitation to the present invention.

What is claimed is:

1. A manufacturing method for forming a laser-solid-forming component, the method comprising:
   obtaining a laser-solid-forming manufacturing device, the device including a forming platform arranged horizontally and configured for placing feedstock, a laser emitter disposed above the forming platform and configured for emitting a laser beam which acts on the feedstock to form a molten pool, and a magnetic field generator, the magnetic field generator comprising a spiral copper coil, a first electrode and a second electrode, wherein the spiral copper coil comprises a spirally-wound copper tube, the first and second electrodes being arranged at respective ends of the copper tube and adapted for loading a voltage to generate a magnetic field in the spiral copper coil, and wherein the spiral copper coil slices an action point of the laser beam and the feedstock;
   uniformly feeding feedstock to the forming platform;
   supplying a voltage of a prescribed level to the spiral copper coil so as to generate a magnetic field;
   regulating a horizontal position of the spiral copper coil and an intersection angle between the spiral copper coil and the forming platform such that the feedstock is located within the magnetic field;
   controlling the laser emitter to emit a laser beam which acts on the feedstock according to a preset path such that the feedstock at a relative position is molten to form the molten pool; and
   accumulating multiple molten pools to obtain the formed laser-solid-forming component;
   wherein the laser-solid-forming manufacturing device further comprises a regulator connected with the spiral copper coil, the method further comprising regulating, using the regulator, the horizontal position of the spiral copper coil and the intersection angle between the spiral copper coil and the forming platform; and
   wherein the regulator comprises a rotating disc, the two ends of the copper tube extending in a same direction and respectively connected with the rotating disc, the method further comprising configuring the rotating disc to rotate thereby driving the spiral copper coil to rotate so as to regulate the intersection angle between the spiral copper coil and the forming platform.

2. The method according to claim 1, wherein the regulator further comprises an x-direction mobile shaft and an x-direction rail, the x-direction rail being horizontally arranged, the x-direction mobile shaft being arranged respectively vertical to the rotating disc and the x-direction rail, wherein one end of the x-direction mobile shaft is inserted in the rotating disc and is rotationally connected with the rotating disc, and the other end of the x-direction mobile shaft is slidingly connected with the x-direction rail in an extension direction of the x-direction rail.

3. The method according to claim 2, wherein the regulator further comprises two y-direction rails, the two y-direction rails being arranged in parallel with each other and vertical to the x-direction rail, the x-direction rail being mounted on the two y-direction rails and is respectively slidingly connected with the two y-direction rails in an extension direction of the y-direction rails.

4. The method according to claim 3, wherein the regulator further comprises a z-direction rail and a mobile platform, the mobile platform being horizontally arranged, the two y-direction rails being fixed to the mobile platform, the z-direction rail being arranged vertical to the mobile platform, wherein a hole is formed in the mobile platform, the z-direction rail passing through the hole so as to be in sliding contact with the mobile platform, the mobile platform being configured to slide up and down along the z-direction rail.

5. The method according to claim 1, wherein the copper tube has a hollow structure, one end of the copper tube being provided with a cooling water inlet valve, and the other end being provided with a cooling water outlet valve, the method further comprising controlling heat dissipation in the laser-solid-forming manufacturing device by feeding circulating cooling water into the hollow copper tube.

6. The method according to claim 1, wherein the laser emitter comprises one of a $CO_2$ gas laser, a Nd-YAG laser, and a fiber laser.

7. The method according to claim 1, wherein uniformly feeding the feedstock to the forming platform comprises uniformly blowing the feedstock to the forming platform under pneumatic action of an inert gas and gravity action of the feedstock.

\* \* \* \* \*